United States Patent [19]
Breid

[11] Patent Number: 5,619,420
[45] Date of Patent: Apr. 8, 1997

[54] SEMICONDUCTOR CELL HAVING A VARIABLE TRANSISTOR WIDTH

[75] Inventor: Duane G. Breid, Lakeville, Minn.

[73] Assignee: LSI Logic Corporation, Milpitas, Calif.

[21] Appl. No.: 434,660

[22] Filed: May 4, 1995

[51] Int. Cl.$^6$ .................................................. G01B 101/80
[52] U.S. Cl. ............................................................ 364/491
[58] Field of Search ............................. 395/500; 364/488, 364/489, 490, 491

[56] References Cited

U.S. PATENT DOCUMENTS

| | | | |
|---|---|---|---|
| 4,024,561 | 5/1977 | Ghatalia | 257/365 |
| 4,827,428 | 5/1989 | Dunlop et al. | 364/491 |
| 5,077,676 | 12/1991 | Johnson et al. | 364/489 |
| 5,079,717 | 1/1992 | Miwa | 364/490 |
| 5,235,521 | 8/1993 | Johnson et al. | 364/489 |
| 5,459,673 | 10/1995 | Carmean et al. | 364/489 |
| 5,477,467 | 12/1995 | Rugg | 364/490 |
| 5,500,805 | 3/1996 | Lee et al. | 364/491 |

*Primary Examiner*—Kevin J. Teska
*Assistant Examiner*—Dan Fiul
*Attorney, Agent, or Firm*—Westman, Champlin & Kelly, P.A.

[57] ABSTRACT

A semiconductor cell layout definition is used to define a semiconductor cell during a layout process of an integrated circuits. The semiconductor cell performs a logical function which is implemented by one or more interconnected transistors. The cell layout definition includes a layout pattern of the interconnected transistors, a transistor width input variable, a cell loading input variable and geometry data for the interconnected transistors. The geometry data for at least one of the transistors is a function of the transistor width input variable. The cell layout definition further includes a propagation delay which is a function of the transistor width and the cell loading input variables. The transistor width input variable allows the widths of the transistors in the cell to be optimized during the layout process to reduce timing violations and minimize power consumption.

16 Claims, 6 Drawing Sheets

SEMICONDUCTOR CELL HAVING A VARIABLE TRANSISTOR WIDTH

BACKGROUND OF THE INVENTION

The present invention relates to a semiconductor cell layout definition for use in a layout process of a semiconductor integrated circuit and, more particularly, to a semiconductor cell layout definition having a variable transistor width.

Semiconductor integrated circuits are designed and fabricated by first preparing a schematic diagram or hardware description language (HDL) specification of a logical circuit in which functional elements are interconnected to perform a particular logical function. The schematic diagram or HDL specification is then passed to a series of computer aided design tools which assist the logic designer in converting the schematic diagram or HDL specification to an integrated circuit layout definition which can be fabricated.

The design tools synthesize the schematic diagram or HDL specification into cells of a specific cell library. Each cell corresponds to a logical function unit which is implemented by one or more transistors. For example, a typical CMOS two-input AND gate is implemented by six interconnected transistors. A typical cell library may have several identical cells for each logical function unit, with each cell having a different, predetermined output drive strength. The logic designer selects the cells according to the number of loads that are attached to the cell as well as the estimated interconnection required for routing.

The cells in the library are defined by cell library definitions. Each cell library definition includes cell layout definitions and cell characteristics. The layout definition includes a layout pattern of the transistors in the cell, geometry data for the cell's transistors and cell routing data. The cell characteristics include a cell propagation delay and a model of the cell's function. The propagation delay is a function of the internal cell delay and the output loading of the cell.

During logic synthesis, the design tools generate a netlist from the schematic diagram or HDL specification of the selected cells and the interconnections between the cells. The netlist is used to place the selected cells at particular locations on the integrated circuit layout. Once the selected cells have been placed, the interconnections between the cells are routed along predetermined routing layers. The design tools then determine the output loading of each cell as a function of the number of loads attached to each cell, the placement of each cell and the routed interconnections.

A timing analysis tool identifies timing violations between sequential or "clocked" elements and between sequential elements and input/output terminals of the circuit. The time it takes for a signal to travel along a particular path from one sequential element to another depends upon the number of cells in the path, the internal cell delay, the number of loads attached to the cells in the path, the length of the routed interconnections in the path, and the drive strengths of the transistors in the path. A timing violation occurs when a signal does not reach the intended sequential element during the appropriate clock cycle.

A timing violation may be caused by a number of factors. For example, a particular cell may not have a large enough drive strength to drive the number of loads that are attached to that cell. Also, exceptionally long routing paths may cause timing violations. Timing violations are eliminated by making adjustments at each stage in the layout process. For example, an under driven cell may be fixed by changing the logic diagram to include a cell having a larger drive strength. Alternatively, the logic diagram can be changed to divide the loads between one or more redundant cells. An exceptionally long routing path can be corrected by adjusting the placement of the cells or dividing loads between one or more redundant cells.

Once the timing violations have been corrected, the netlist, the cell layout definitions, the placement data and the routing data together form an integrated circuit layout definition which is used to fabricate the integrated circuit.

The overall power consumption of the integrated circuit is often a concern for the logic designer. The power consumption of an integrated circuit can be reduced through transistor downsizing. Cells having excess drive strength are replaced with other cells in the cell library having lower drive strength. Sizing the transistors in this manner requires a cell library with either a large number of drive strengths per cell function for fine granularity of output drive strength, or only a few drive strengths per cell function with large granularity of output drive strength. Also, sizing the transistors in this manner requires a large number of design iterations. Once the schematic diagram or HDL specification has been changed to replace one cell with another, or when the logic synthesis replaces a cell based on layout data, all subsequent steps must be repeated, including logic synthesis, cell placement, routing and timing analysis.

SUMMARY OF THE INVENTION

The present invention is a semiconductor cell library definition for defining a semiconductor cell during a layout process of an integrated circuit. The cell library definition includes a layout pattern of interconnected transistors, a transistor width input variable, a cell loading input variable and geometry data for the interconnected transistors. The geometry data of at least one of the transistors in the semiconductor cell is a function of the transistor width input variable. The cell library definition further includes a propagation delay which is a function of the cell loading input variable and the transistor width input variable.

During the layout process of the present invention, a schematic diagram or HDL specification is prepared and then synthesized into a netlist of interconnected semiconductor cells which are selected from a cell library. Each cell in the library corresponds to a particular logical function and is defined by a library definition according to the present invention.

The selected cells are placed in a layout pattern by arranging the cells in particular locations on an integrated circuit layout. Interconnections between the placed cells are then routed. Once placement and routing is complete, a timing analysis tool is used to identify timing violations. The timing analysis tool first determines the output loading of each cell based upon the routed interconnections of that cell as well as the cell input loading of driven cells. The output loading of each cell is passed to that cell's library definition through the cell loading input variable. Since the cell input loading of the driven cells may vary based upon their cell transistor width input variables, the timing analysis tool initially accounts for a minimum and a maximum value of input loading.

Next, the timing analysis tool determines an optimum width of the transistors in each cell as a function of the loading of that cell and predetermined physical data of the cell. The optimum width is passed to the cell layout definition through the transistor width input variable. Because output loading of a cell is dependent upon input loading of its driven cells, which is dependent on the driven cells' transistor width input variables, the optimum width of the cell is determined through iteration of the transistor width input variable and the driven cell or cells' transistor width input variables. The timing analysis tool then verifies the timing of signals between sequential elements and identifies any remaining timing violations.

The transistor width input variable can be used to optimize the widths of transistors in particular cells to reduce or eliminate timing violations and to minimize power consumption of each cell. The widths of transistors having a large number of loads can be increased during the timing analysis in order to provide higher drive capability. The widths of transistors that have excess drive capability can be reduced to minimize power consumption. The ability to dynamically vary transistor widths on a cell-by-cell basis during the layout process reduces the number of design iterations required to provide an integrated circuit that has no timing violations and consumes minimal power.

In an alternative embodiment, the timing analysis is performed and all timing violations are eliminated by conventional methods before the transistor widths are optimized. Once the timing violations have been eliminated by adjusting the loading, placement or routing of cells, the widths of transistors having excess drive capability are reduced based on the output of the timing analysis.

DETAILED DESCRIPTION OF THE PREFERRED EMBODIMENTS

The present invention is a semiconductor cell library definition for defining a semiconductor cell during a layout process of an integrated circuit. The cell library definition includes a transistor width input variable which allows transistors in the cell to be sized on a cell-by-cell basis or even a transistor-by-transistor basis during the layout process to eliminate timing violations and to minimize power consumption.

The layout process of an integrated circuit involves transforming a schematic diagram or HDL specification of a logical circuit into an integrated circuit layout definition that can be used for fabrication. Functional elements within the schematic diagram or HDL specification are implemented with one or more cells that are selected from a specific cell library, such as a library of complementary-symmetry metal oxide semiconductor (CMOS) logic cells.

Each cell in the library corresponds to a particular functional unit. The functional units provide basic building blocks for more complex logical functions. For example, basic cell functions include AND, NAND, OR, NOR, inverter and buffer functions. Each cell is formed with one or more transistors which are interconnected in a cell layout pattern to perform the logical function.

Associated with each cell is a cell library definition which includes a cell layout definition and cell characterizations. The cell layout definition includes the cell layout pattern, the geometry data for the transistors in the cell and local cell routing data. The cell characterizations include cell timing characteristics and a model of the cell's logical function. The cell library definition is used during the layout process of the integrated circuit to form the overall integrated circuit layout definition and to perform timing and functional simulations.

Figure 1:
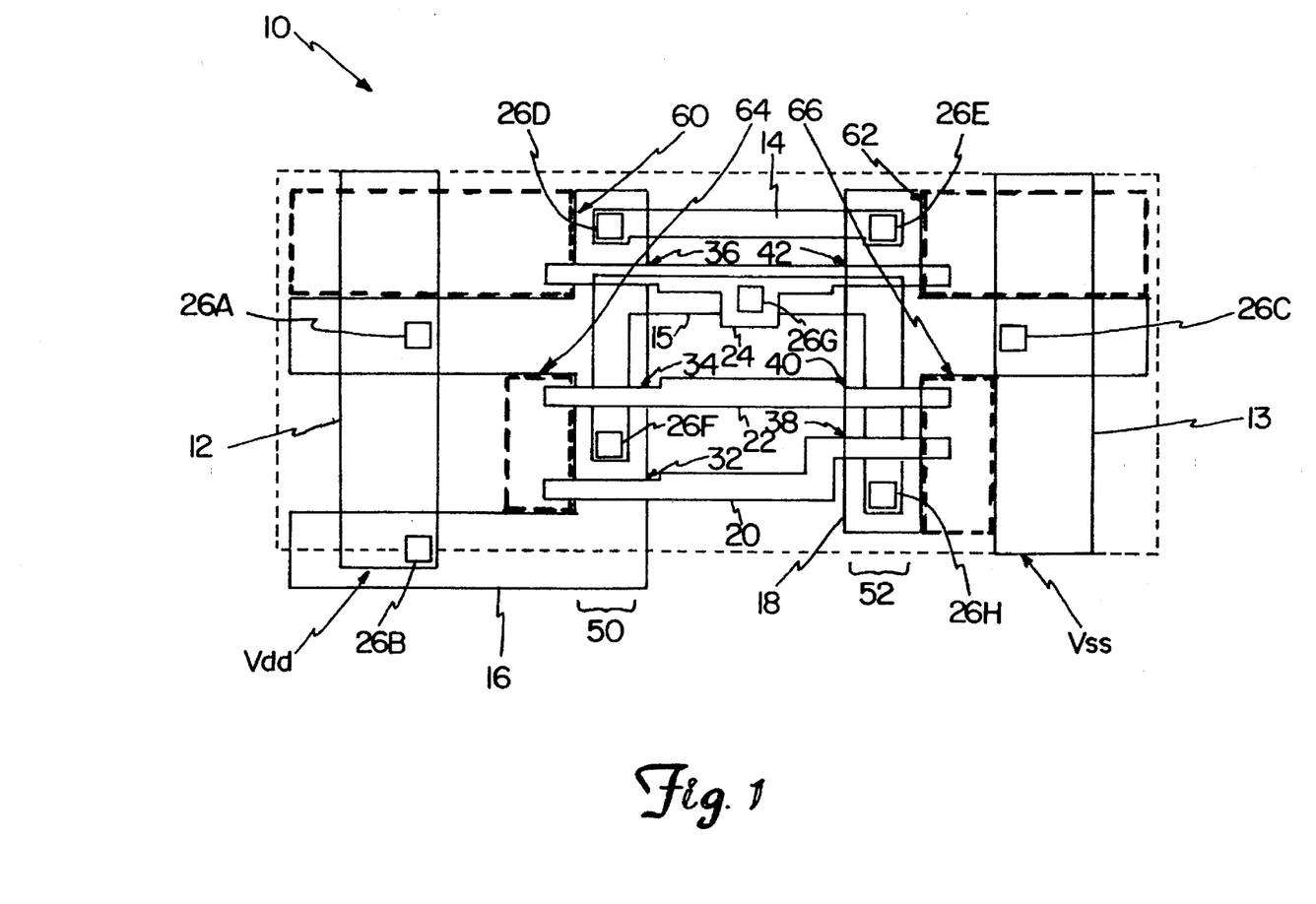
FIG. 1 is a diagram of a layout pattern for a two-input AND gate having transistors sized to provide minimum drive strength, according to the present invention.

FIG. 1 is a diagram of a cell layout pattern for a CMOS two-input AND gate which has a cell layout definition according to the present invention. The AND gate is a two-stage cell containing a two-input NAND gate followed by an inverter. Layout pattern 10 includes metal layers 12, 13, 14 and 15, diffusion layers 16 and 18, polysilicon layers 20, 22 and 24 and contacts 26a–26h. Metal layer 12 forms a relatively positive voltage supply rail Vdd while metal layer 13 forms a relatively negative voltage supply rail Vss. Layer 16 forms a $P^+$-type diffusion and layer 18 forms an $N^+$-type diffusion.

Six transistors are formed on diffusion layers 16 and 18, including p-channel transistors 32, 34 and 36 and n-channel transistors 38, 40 and 42. The gate of each transistor is defined by the region at which polysilicon layers 20, 22 and 24 overlap diffusion layers 16 and 18. The width of the gate (the extent of the overlap) determines the drive capability of each transistor. In the embodiment shown in FIG. 1, transistors 32, 34 and 36 have a width 50 while transistors 38, 40 and 42 have a width 52.

Polysilicon layers 20 and 22 form input terminals of the two-input AND gate while metal layer 14 forms an output terminal. Transistors 32, 34, 38 and 40 are internal transistors which perform the two-input NAND function in the first stage of the cell, and transistors 36 and 42 are output drivers which perform the inverter function in the second stage of the cell.

Contacts 26a–26h indicate connections between layers in the cell. Metal layer 12 is connected to diffusion layer 16 through contacts 26a and 26b. Metal layer 13 is connected to diffusion layer 18 through contact 26c. Metal layer 14 is connected to diffusion layer 16 through contact 26d and to diffusion layer 18 through contact 26e. Metal layer 15 is connected to diffusion layer 16 through contact 26f, to polysilicon layer 24 through contact 26g and to diffusion layer 18 through contact 26h. The arrangement and interconnection of transistors 32, 34, 36, 38, 40 and 42 form the two-input AND gate.

Layout pattern 10 is used to form a semiconductor cell library definition for the two-input AND gate. According to the present invention, the cell library definition includes a cell loading input variable and a transistor width input variable. In the embodiment shown in FIG. 1, each cell transistor has a minimum width and thus a minimum drive strength. Sizing window 60 indicates an area over which diffusion layer 16 can be extended to widen output transistor 36 and thereby increase its drive strength. Window 62 indicates an area over which diffusion layer 18 can be extended to widen output transistor 42. The window size of the output transistors is determined by architectural constraints of the layout consistent with the specific cell library.

Window 64 indicates an area over which diffusion layer 16 can be extended to widen internal cell transistors 32 and 34. Window 66 indicates an area over which diffusion layer 18 can be extended to widen internal cell transistors 38 and 40. Several factors determine the window size of non-output transistors in the cell. These factors include the loading of the transistors, the layout of the transistors in the cell, the interconnections between the transistors, the function of the cell, and other physical data of the cell.

Since transistors 36 and 42 are output transistors that require a fairly large drive strength, windows 60 and 62 are relatively large as compared to windows 64 and 66 of internal transistors 32, 34, 38 and 40. This allows the width of output transistors 36 and 42 to be increased significantly to drive large loads if necessary, and the width of transistors 32, 34, 38 and 40 to be sized in a near optimum match for driving the variable load presented by transistors 36 and 42.

The transistor width input variable determines the width of the transistors with respect to windows 60, 62, 64 and 66. The transistor width input variable can be a factor (0 to 1.0) or a percentage (0% to 100%) of the window size. Alternatively, the transistor width input variable can be a value indicating a specific width.

In one embodiment, one transistor width input variable determines the size of all transistors associated with a particular output, although the sizes of each transistor may be different. Relative sizing between the transistors is a function of the above-identified cell characteristics. For example, window 60 for p-channel output transistor 36 is larger than window 62 for n-channel output transistor 42. With CMOS logic, the effective pull-up and pull-down resistances of p-channel and n-channel transistors may be different. This causes the rise time and fall time characteristics of a particular cell output to differ from one another. By varying the widths of the p-channel and n-channel transistors independently as a function of one input variable, the rise-time and fall-time of the cell may be matched to one another.

With respect to the internal transistors, the widths of these transistors may be a function of the widths of the output transistors. In alternating logic in which each transistor stage comprises an inverter formed by a stacked p-channel and n-channel transistor pair, the window factor for the p-channel transistor in one stage is preferably matched with the window factor for the n-channel transistor in the subsequent stage. Likewise, the window factor for the n-channel transistor in one stage is preferably matched with the window factor for the p-channel transistor in the subsequent stage. In FIG. 1, internal n-channel transistors 38 and 40 are sized by the same window factor as p-channel output transistor 36. Internal p-channel transistors 32 and 34 are sized by the same window factor as n-channel output transistor 42.

However, other relationships can be made when determining the relative sizing of cell transistors. The cell transistors can also be sized independently by their own input variable. For cells having more than one output, the cell layout definition can include one transistor width input variable for each output which determines the width of the transistors associated with that output. Once the window factor has been set, the cell propagation delay is calculated as a function of the transistor widths in the cell according to the selected window factor.

Figure 2:
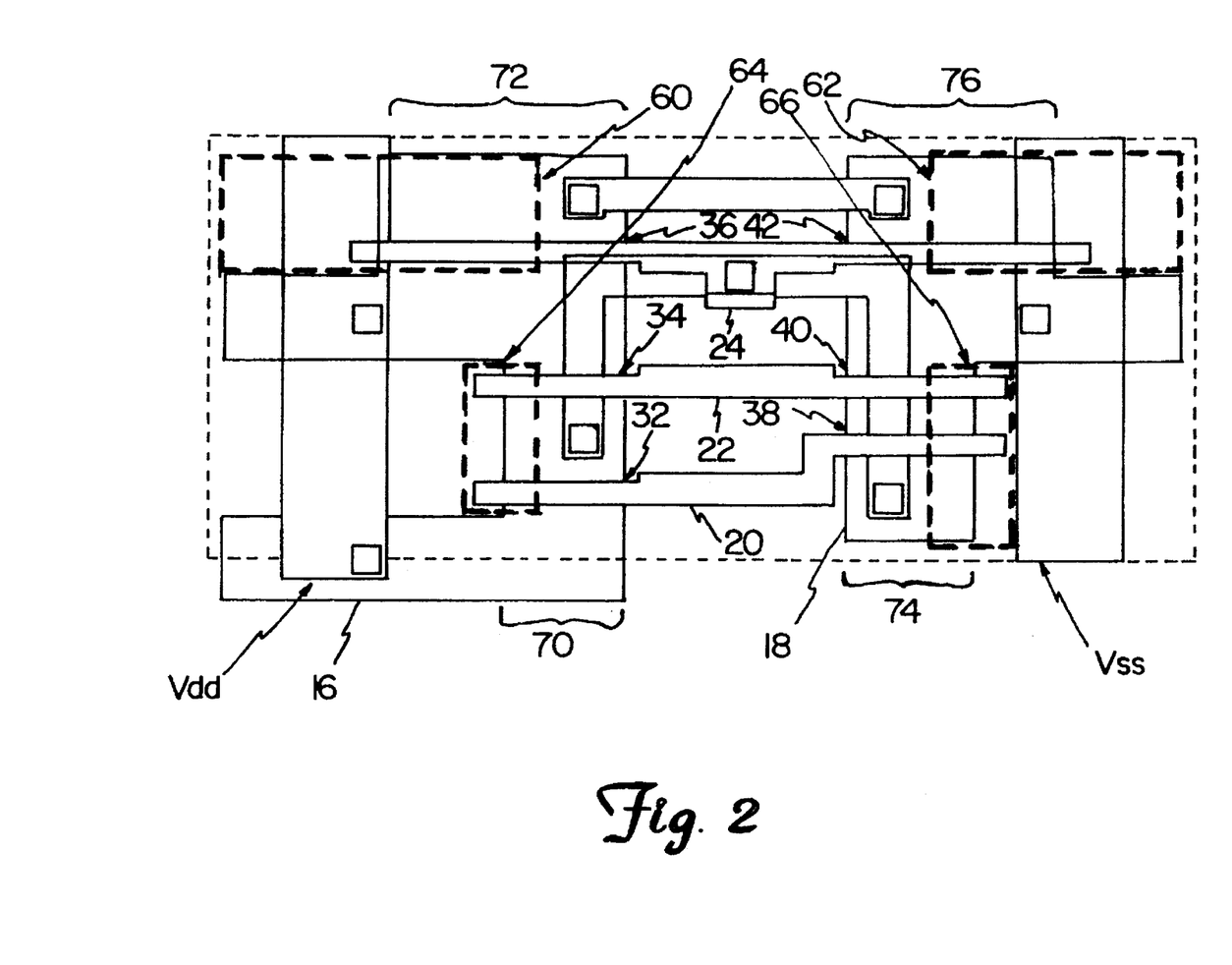
FIG. 2 is a diagram of a layout pattern for a two-input AND gate having transistors sized to provide a fifty percent drive strength, according to the present invention.

FIG. 2 is a diagram of a cell layout pattern similar to FIG. 1, but with each of the transistors being sized at 50% (a factor of 0.5) of the maximum width, as indicated by windows 60, 62, 64 and 66. FIG. 2 uses the same reference numerals for common elements as were used in FIG. 1. In FIG. 2, p-channel diffusion layer 16 has been extended with polysilicon layers 20, 22 and 24 to increase the width of transistors 32, 34 and 36. Transistors 32 and 34 now have a width 70 while transistor 36 has a width 72. N-channel diffusion layer 18 has been extended with polysilicon layers 20, 22 and 24 to increase the width of transistors 38, 40 and 42. Transistors 38 and 40 now have a width 74 while transistor 42 has a width 76.

Figure 3:
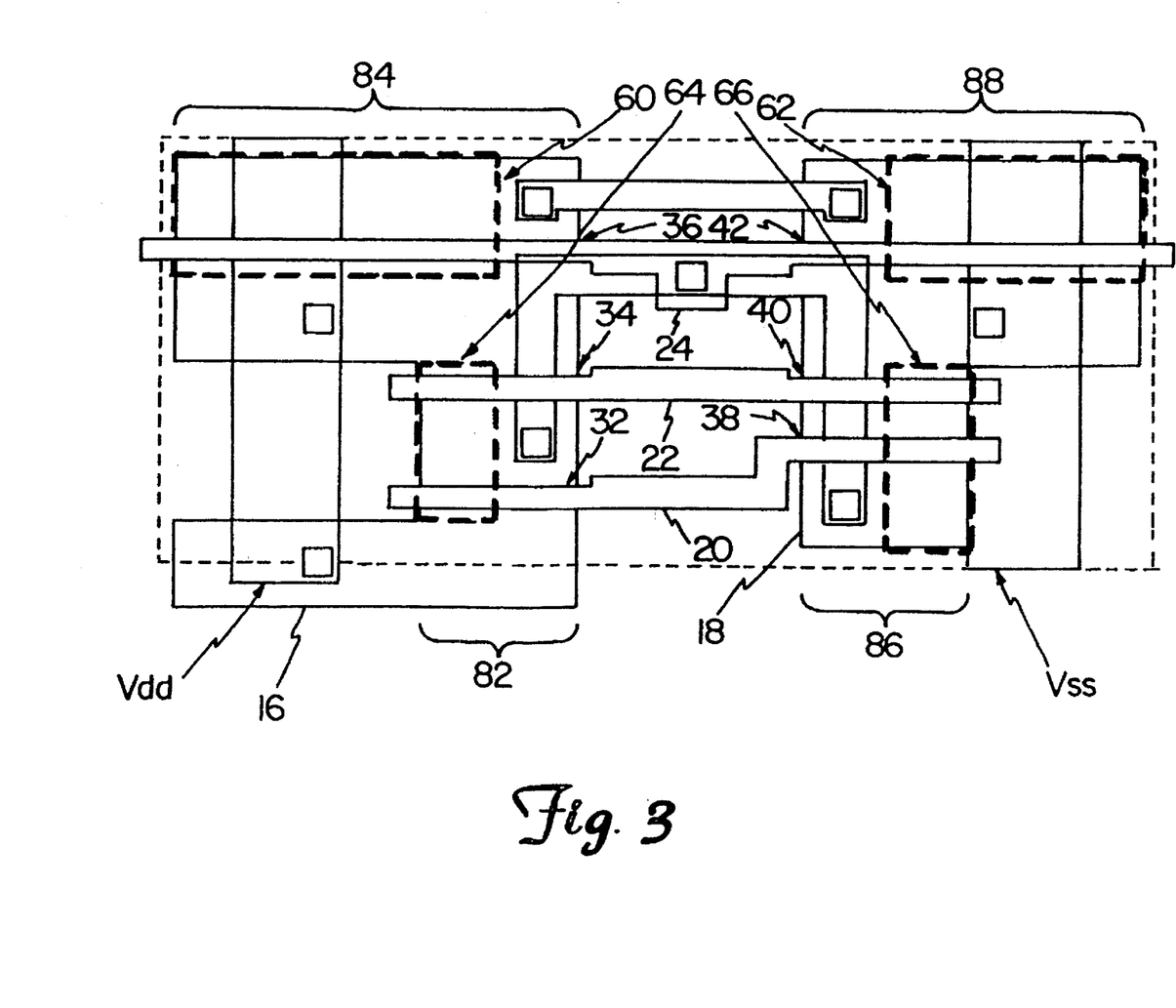
FIG. 3 is a diagram of a layout pattern for a two-input AND gate having transistors sized to provide maximum drive strength, according to the present invention.

FIG. 3 is a diagram of a cell layout pattern similar to FIGS. 1 and 2, but with each of the transistors being sized at 100% (a factor of 1.0) of the maximum width, as indicated by windows 60, 62, 64 and 66. P-channel diffusion layer 16 has been extended over windows 60 and 64 such that transistors 32 and 34 have a width 82 while transistor 36 has a width 84. N-channel diffusion layer 18 has been extended over windows 62 and 66 such that transistors 38 and 40 have a width 86 while transistor 42 has a width 88.

As shown in FIGS. 1–3, the transistor width input variable can be used during the layout process to dynamically vary the widths of transistors on a cell-by-cell basis without affecting the integrated circuit-level layout since the cell size remains constant. The window factor for a particular cell can be selected to provide increased drive capability or to minimize power consumption of that particular cell. To minimize power consumption of cells having excess drive capability, the window factor for those cells can be reduced to reduce the width and thus the capacitance, which results in lower switching power. In this way, transistor sizing can be optimized during the layout process for each cell in the integrated circuit to provide adequate drive capability and yet minimize the overall power consumption of the integrated circuit.

Figure 4:
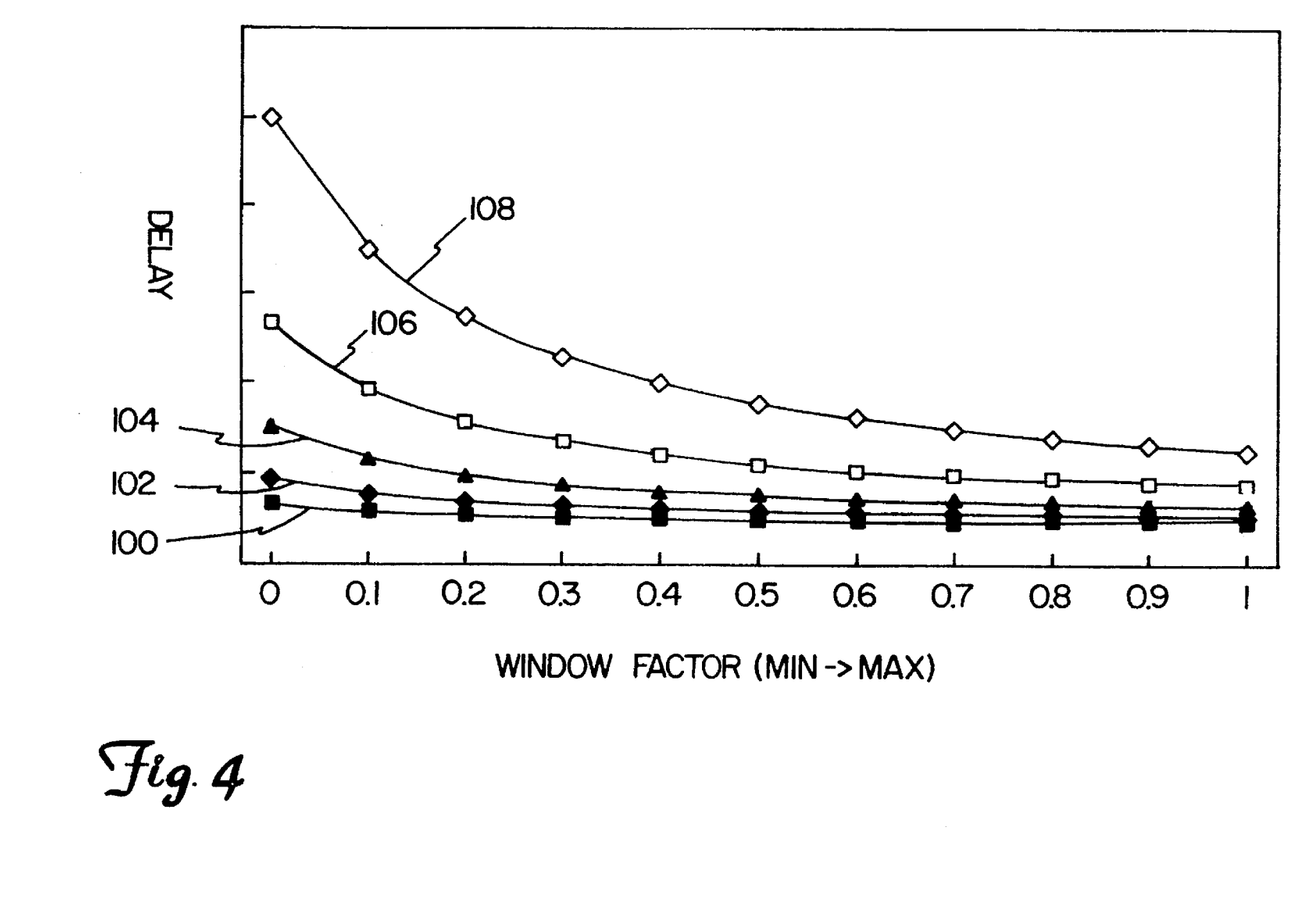
FIG. 4 is a graph illustrating propagation delay as a function of output loading and transistor sizing.

FIG. 4 is a graph illustrating propagation delay of a CMOS two-input AND gate cell as a function of the transistor width input variable (as a window factor) and the output loading of the cell, according to the present invention. Curve 100 represents the propagation delay with one output load over a window factor of 0 to 1.0. Curve 102 represents the propagation delay with two output loads. Curve 104 represents the propagation with four output loads. Curve 106 represents the propagation delay with eight output loads. Finally, curve 108 represents the propagation delay with 16 output loads. Each curve is a complex function of the number of output loads, the internal cell geometries, the layout of the transistors in the cell, the routing of the interconnections between the transistors and other physical data of the cell.

As shown in FIG. 4, increasing the window factor and thus the drive capability of the cell significantly decreases the propagation delay of cells having a large number of output loads. Cells having a small number of loads have excess drive capability. The window factor for these cells can be decreased significantly without significantly increasing the propagation delay.

The information shown in FIG. 4 is incorporated into the cell library definition to determine the cell propagation delay and to assist in selecting an appropriate window factor. In one embodiment, the propagation delay is characterized in the form of a mathematical equation having two input variables, including the window factor and the cell output loading. In an alternative embodiment, there is a separate mathematical equation for each number of loads, with each equation having a window factor input variable. The mathematical equations can be determined by well-known curve fitting techniques.

In yet another alternative embodiment, the propagation delay is characterized in the form of a matrix of predetermined window factors and output loads. The propagation delays for only a selected number of window factors and output loads are stored in the matrix. The propagation delays for window factors falling between two data points in the matrix, such as a window factor of 0.25 in FIG. 4, is determined through a linear interpolation of the surrounding data points in the matrix. Similarly, the propagation delays for output loads falling between two data points in the matrix, such as an output load of 3 in FIG. 4, is determined through a linear interpolation of the data points in adjacent curves, such as curves 102 and 104. Other methods of determining intermediate data points can also be used in accordance with the present invention.

Figure 5:
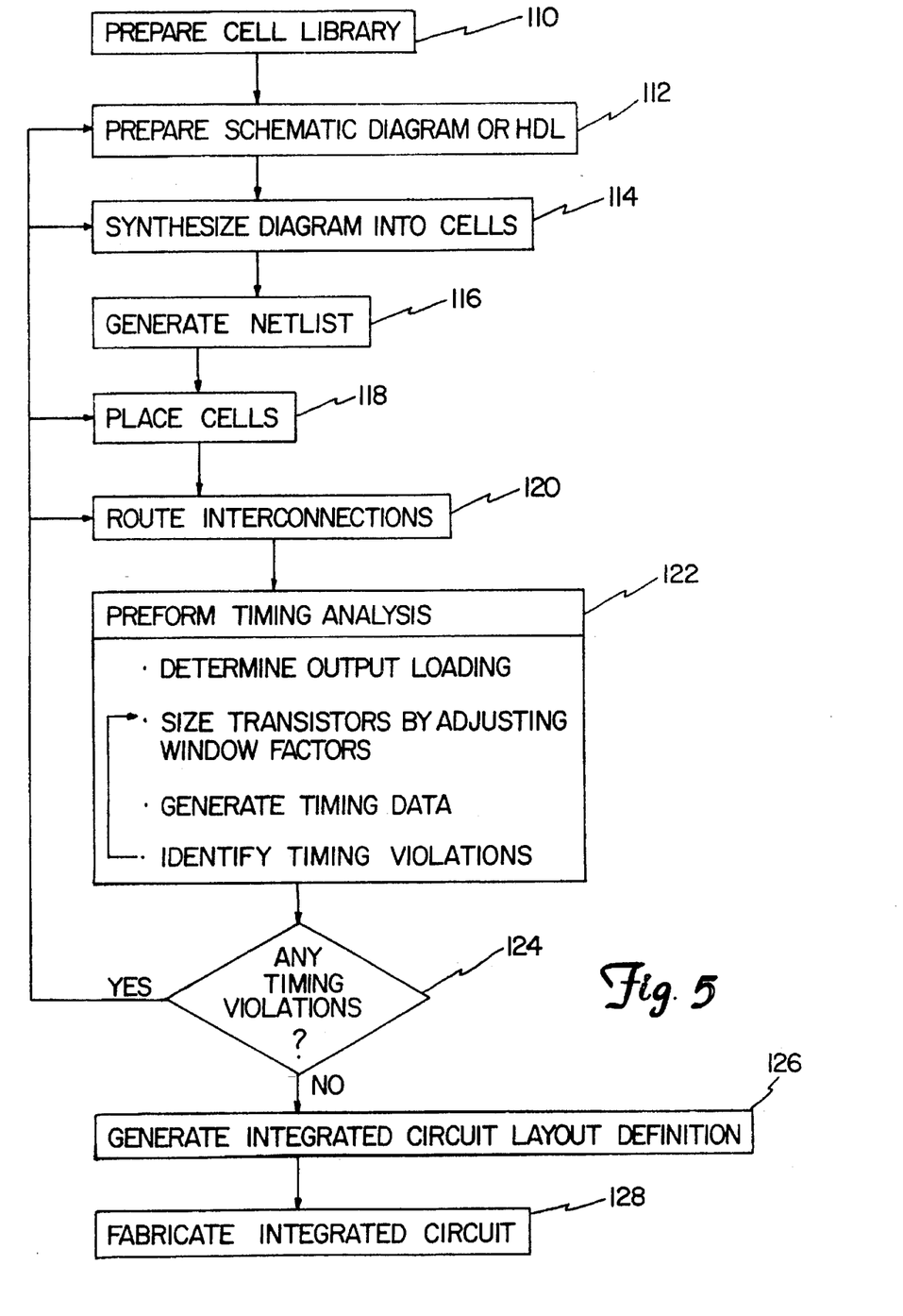
FIG. 5 is a flow chart of a layout process according to one embodiment of the present invention.

FIG. 5 is a flow chart of a layout process according to one embodiment of the present invention. The layout process includes steps 110–128. The first step in the layout process is to prepare a cell library. The cell library is typically prepared by the manufacturer of the integrated circuit. As mentioned above, each cell in the cell library includes a cell library definition having physical data and timing characteristics associated with that cell and having a transistor width input variable and a cell loading input variable.

At step 112, the logic designer prepares a schematic diagram or HDL specification in which functional elements are interconnected to perform a particular logical function. Once the schematic diagram or HDL specification is complete, it is passed to a series of computer aided design tools, beginning at step 114, which assist the logic designer in converting the schematic diagram or HDL specification to a semiconductor integrated circuit layout definition which can be fabricated. The schematic diagram or HDL specification is first synthesized, at step 114, into cells of the cell library defined in step 110. Each cell has an associated cell library definition according to the present invention.

At step 116, the design tools generate a netlist of the selected cells and the interconnections between the cells. At step 118, the selected cells are placed by arranging the cells in particular locations to form a layout pattern for the integrated circuit. Once all the selected cells have been placed, the interconnections between the cells are routed, at step 120, along predetermined routing layers.

A timing analysis tool is used, at step 122, to generate timing data for electrical signal paths and to identify timing violations. The timing analysis tool first determines the output loading of each cell based upon the routed interconnections of that cell and the input loading of the driven cells. Since the input loading of the driven cells may vary based upon their transistor width input variables, the timing analysis tool should initially account for minimum and maximum values of input loading. The output loading is passed to the cell layout definition through the cell loading input variable.

Next, the timing analysis tool determines an optimum width of the transistors in each cell as a function of the loading of that cell and the internal cell physical data discussed with reference to FIGS. 1–4. The optimum width is passed as a window factor to the cell layout definition through the transistor width input variable. Because output loading is dependent on the driven cells' input loading, which is further dependent on their transistor width input variables, the optimum width is determined through iteration of the transistor width input variable and the driven cells' transistor width input variables.

The timing analysis tool then verifies the timing of signal paths between sequential elements, and between sequential elements and input/output terminals of the circuit. A sequential element is an element that is latched or clocked by a clock signal. The timing data indicates the time required for a signal to travel from one sequential element to another with respect to the clock signal. A timing violation occurs when a signal does not reach the intended sequential element during the appropriate clock cycle.

The timing analysis tool uses the transistor width input variable to optimize the widths of the transistors in particular cells to reduce or eliminate timing violations and to minimize power consumption of each cell. The width of transistors having a large number of loads can be increased during the timing analysis process in order to provide higher drive capability. The width of transistors that have excess drive capability can be reduced to minimize power consumption.

The optimum width of the transistors in each cell can be determined in a number of ways. For example, the timing analysis tool can use an iterative process in which the timing analysis is first performed with a set of default transistor sizing window factors. Based on these results, the window factor of each cell can be adjusted independently to eliminate timing violations or to minimize power consumption. The iterative process of determining the transistor sizing window factor can be repeated one or more times to further optimize the window factor of each cell.

The ability to dynamically vary transistor widths on a cell-by-cell basis during the layout process reduces the number of design iterations required to provide an integrated circuit that has no timing violations and consumes minimal power. The logic designer no longer has to return to the schematic diagram in order to select a different cell having a higher or lower drive capability. Also, most, if not all, timing violations caused by placement or routing errors can be eliminated through the transistor sizing process of the present invention.

At step 124, if there are any timing violations that were not corrected through the transistor sizing process, the logic designer can make changes to the schematic diagram or HDL specification, at step 112, update logic synthesis, at step 114, change the placement of cells, at step 118, or change the routing, at step 120.

Once all of the timing violations have been corrected, an integrated circuit layout definition is prepared, at step 126, which includes a netlist of the selected cells and the interconnections between the cells. The definition further includes placement data for the cells, routing data for the interconnections between the cells and cell layout definitions. The cell layout definitions include layout patterns of the interconnected transistors, local cell routing data and geometry data for the interconnected transistors. As mentioned above, the geometry data is a function of the selected transistor sizing window factor. The integrated circuit layout definition is then used to fabricate the integrated circuit at step 128.

Figure 6:
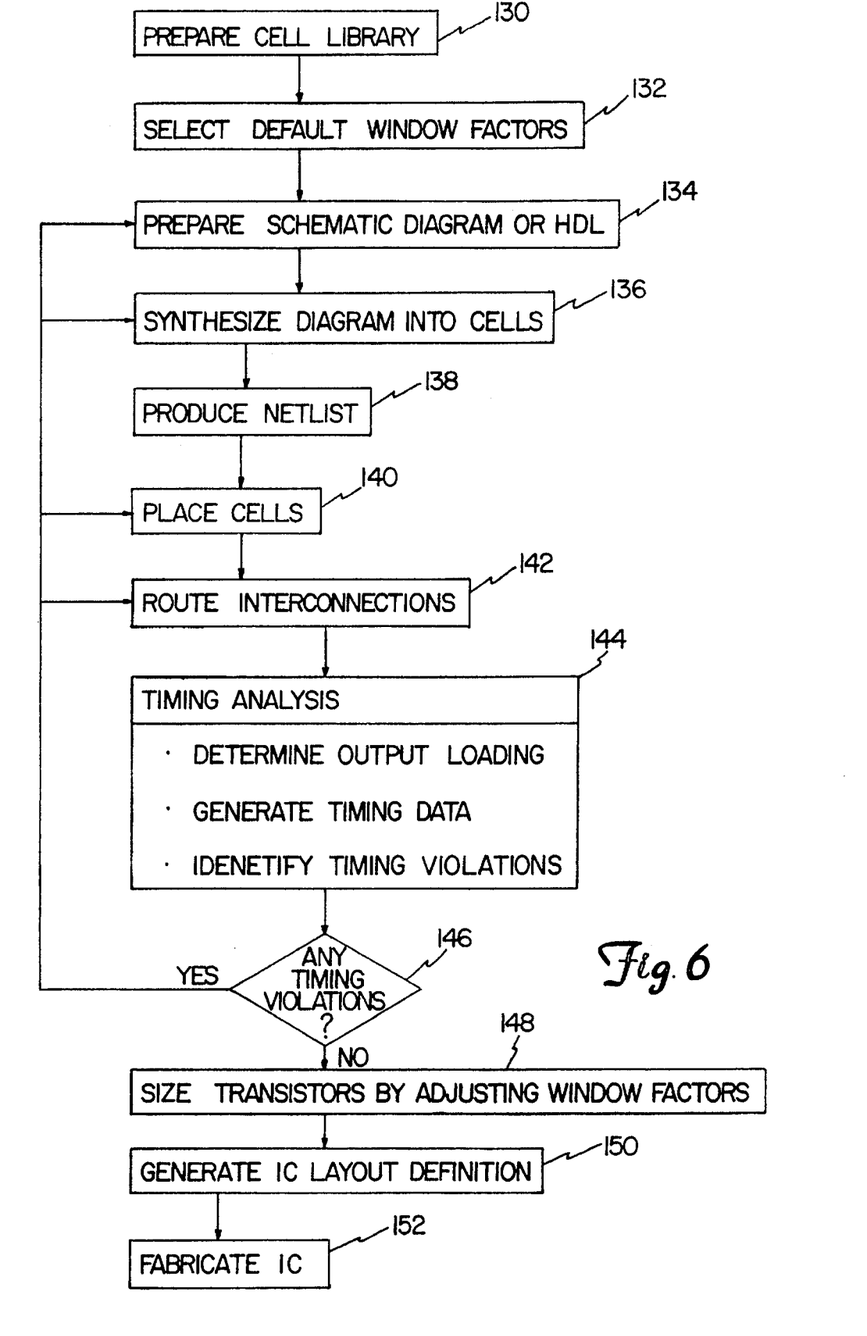
FIG. 6 is a flow chart of a layout process according to another embodiment of the present invention.

FIG. 6 is a flow chart of a layout process according to another embodiment of the present invention. The layout process shown in FIG. 6 includes steps 130–152. A cell library is prepared at step 130 according to the present invention. At step 132, a default window factor is selected for each cell. This window factor is used to determine the initial geometry data and propagation delays for each cell. As in the layout process shown in FIG. 5, the logic designer prepares a schematic diagram or HDL specification at step 134 which is synthesized into cells from the cell library, at step 136. A netlist is prepared of the selected cells and the interconnections between the cells, at step 138. Each cell is placed at a particular location on an integrated circuit layout pattern, at step 140. Interconnections between individual cells are routed, at step 142.

Once placement and routing is complete, timing analysis is performed to identify timing violations at step 144. A timing analysis tool determines the output loading of each cell, generates timing data for each signal path and identifies any timing violations. If there are any timing violations, at step 146, the violations are corrected by making changes to the schematic diagram or HDL specification at step 134, validating logic synthesis at step 136, adjusting the placement of cells at step 140 or adjusting routing paths at step 142.

Once all timing violations have been eliminated, the size of the transistors in each cell are optimized, at step 148, by adjusting the window factor for each cell according to the timing data generated by the timing analysis tool. An overall integrated circuit layout definition is generated at step 150 which is used to fabricate the integrated circuit at step 152.

The advantage of the layout process shown in FIG. 6 is that conventional computer aided design tools can be used to perform the steps of synthesizing logic, placing cells, routing interconnections and analyzing timing. The initial cell characterizations are determined by the default window factor. Thereafter, the window factor is ignored by the conventional design tools. Once the timing violations have been eliminated, a customized design tool can be used to adjust the window factor to optimize transistor sizes on a cell-by-cell basis.

A disadvantage of the layout process shown in FIG. 6 is that timing violations are not corrected during timing analysis by adjusting the window factor. This increases the time and effort required to eliminate timing violations but allows cell layout definitions having variable transistor widths to be used with conventional computer aided design tools. In the layout process shown in FIG. 5, the computer aided design tools must be customized to accept a transistor width input variable.

Although the present invention has been described with reference to preferred embodiments, workers skilled in the art will recognize that changes may be made in form and detail without departing from the spirit and scope of the invention. For example, the arrangement and order of steps shown in FIGS. 5 and 6 are not critical. The layout process described above can be adjusted in many ways to suit a particular application. The manner in which individual transistors within a cell are sized based on the input variable and the number of input variables used per cell can vary between applications. The embodiments described above are provided only as examples. Also, the cell library definition and the method described above can be applied to technologies other than CMOS logic.

What is claimed is:

1. A semiconductor cell library for defining a plurality of semiconductor cells during a layout process of an intergrated circuit, wherein the library comprises a semiconductor cell definition for each of the plurality of semiconductor cells and wherein at least one of the semiconductor cell definitions comprises:

a cell layout pattern of interconnected transistors;

a transistor width input variable which is independent of the transistor width input variables of the semiconductor cell definitions for the other semiconductor cells;

a cell loading input variable;

geometry data for the interconnected transistors, wherein the geometry data for at least one of the transistors is a function of the transistor width input variable; and a cell propagation delay characteristic which is a function of the cell loading input variable and the transistor width input variable.

2. The semiconductor cell library of claim 1 wherein geometry data for the interconnected transistors has a maximum transistor width and the transistor width input variable includes a factor of the maximum transistor width.

3. The semiconductor cell library of claim 1 wherein the cell layout pattern includes first and second interconnected transistors and wherein the geometry data for the first transistor is a different function of the transistor width input variable than the geometry data for the second transistor.

4. The semiconductor cell library of claim 1 wherein:

the cell layout pattern includes a stacked pair of CMOS n-channel and p-channel output transistors;

the cell propagation delay characteristic includes a rise time characteristic and a fall time characteristic associated with the stacked pair of CMOS n-channel and p-channel transistors; and the geometry data for the n-channel transistor is a different function of the transistor width input variable than the geometry data for the p-channel transistor.

5. The semiconductor cell library of claim 1 wherein:

the cell layout pattern defines a plurality of output terminals, with each output terminal being driven by associated transistors;

the transistor width input variable includes an independent width variable for each output terminal;

the cell loading input variable includes a loading variable for each output terminal; and the cell propagation delay characteristic includes a characteristic for each output terminal which is a function of the loading variable and the width variable for that output terminal.

6. A method of forming a layout definition of a semiconductor integrated circuit, comprising:

selecting cells from a predetermined cell library, wherein the cells in the library correspond to logical functions and are formed of at least one transistor having a variable width;

arranging the selected cells in a layout pattern;

routing interconnections between the arranged cells;

determining loading of the arranged cells based upon the routed interconnections; and varying the width of the transistor in at least two arranged cells independently of one another as a function of the loading of those cells.

7. The method of claim 6 and further comprising: performing timing analysis on the arranged cells and routed interconnections to identify timing violations, wherein the timing analysis includes the step of varying the width of the transistor in at least two cells to minimize timing violations and to minimize power consumption of those cells.

8. The method of claim 6 and further comprising:

setting a default transistor width for the cells in the cell library;

performing timing analysis on the arranged cells and routed interconnections based on the default transistor widths;

identifying and correcting timing violations; and performing the step of varying the width of the transistor in at least two cells after identifying and correcting the timing violations.

9. The method of claim 6 wherein:

selecting cells includes selecting a cell formed of a plurality of transistors; and varying the width of the transistor in at least one cell comprises varying the width of each of the plurality of transistors in the selected cell as a function of the loading of each transistor in the cell and the loading of the cell.

10. The method of claim 6 wherein:

selecting cells includes selecting a cell having a plurality of output terminals, with each output terminal being driven by at least one associated transistor; and varying the width includes varying the width of the transistors associated with one of the output terminals independently of the width of the transistors associated with the other output terminals.

11. The method of claim 6 wherein:

selecting cells includes selecting a cell from a CMOS cell library having a stacked pair of CMOS n-channel and p-channel output transistors; and varying the width includes varying the width of the n-channel transistor independently of the width of the p-channel transistor.

12. A layout definition for a semiconductor integrated circuit, comprising:

a plurality of selected semiconductor cells, with each semiconductor cell corresponding to a logical function and having a layout pattern of interconnected transistors;

a netlist of the selected semiconductor cells and interconnections between the selected semiconductor cells;

placement data which defines a physical location on the integrated circuit of each selected semiconductor cell;

routing data which defines routes on the integrated circuit for the interconnections between the selected semiconductor cells;

output loading data for each selected semiconductor cell which is a function of the placement data, the netlist of interconnections and the routing data;

a transistor width input variable for each selected semiconductor cell; and cell data for each selected semiconductor cell, comprising:

geometry data for the interconnected transistors which is a function of the corresponding transistor width input variable; and a cell propagation delay which is a function of the corresponding loading data and the corresponding transistor width input variable.

13. The layout definition of claim 12 wherein:

the netlist includes a list of cells driven by each selected semiconductor cell; and the output loading data for each selected semiconductor cell is further a function of the transistor width input variables of the driven cells.

14. A semiconductor cell layout definition for defining a semiconductor cell during a layout process of an integrated circuit, the definition comprising:

a cell layout pattern of interconnected transistors;

a plurality of output terminal, with each output terminal being driven by associated ones of the interconnected transistors;

an independent width input variable for each output terminal;

an independent cell loading input variable for each output terminal;

geometry data for the interconnected transistors, wherein the geometry data for the transistors associated with each output terminal is a function of the transistor width input variable of the corresponding output terminal.

15. An apparatus for preparing a layout definition of a semiconductor integrated circuit, comprising:

a cell library, wherein the cells in the library correspond to logical functions and are formed of at least one transistor having a variable width;

means for selecting cells from the predetermined cell library;

means for arranging the selected cells in a layout pattern;

means for routing interconnections between the arranged cells;

means for determining loading of the arranged cells based upon the routed interconnections; and means for varying the width of the transistor in at least one arranged cell as a function of the loading of that cell and independently of the widths of the other arranged cells.

16. The layout definition of claim 12 wherein the netlist of selected semiconductor cells comprises at least two instances of one of the selected semiconductor cells and wherein the transistor width input variables for the two instances are independent of one another.

* * * * *

UNITED STATES PATENT AND TRADEMARK OFFICE
CERTIFICATE OF CORRECTION

PATENT NO. : 5,619,420
DATED : April 8, 1997
INVENTOR(S) : Duane G. Bried

It is certified that error appears in the above-indentified patent and that said Letters Patent is hereby corrected as shown below:

Title page,
Under [56] References cited:

Insert --5,365,454  11/1984  Nakagawa et al.  364/491--.

Under [57] ABSTRACT:

In line 3, delete "circuits" and insert therefore --circuit--.

Signed and Sealed this

Ninth Day of February, 1999

Attest:

Attesting Officer

Acting Commissioner of Patents and Trademarks